United States Patent
Thompson et al.

(10) Patent No.: US 6,725,382 B1
(45) Date of Patent: Apr. 20, 2004

(54) DEVICE SECURITY MECHANISM BASED ON REGISTERED PASSWORDS

(75) Inventors: John S. Thompson, Boulder, CO (US); Melinda M. Thompson, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/454,625

(22) Filed: Dec. 6, 1999

(51) Int. Cl.[7] .......................... G06F 11/30; G06F 12/14
(52) U.S. Cl. .......................... 713/202; 713/2; 713/155; 713/183; 340/5.54; 340/5.85
(58) Field of Search .......................... 713/183, 185, 713/189, 155, 202; 340/7.2, 5.54, 5.74–5.85, 568.2, 571, 7.1; 455/411; 380/44

(56) References Cited

U.S. PATENT DOCUMENTS

| | | | | |
|---|---|---|---|---|
| 4,758,718 | A | 7/1988 | Fujisaki et al. | 235/487 |
| 5,719,941 | A | 2/1998 | Swift et al. | 713/155 |
| 5,793,771 | A | 8/1998 | Darland et al. | 370/467 |
| 5,852,722 | A | 12/1998 | Hamilton | 709/221 |
| 5,892,906 | A | 4/1999 | Chou et al. | 713/202 |
| 6,038,320 | A | * 3/2000 | Miller | 380/44 |
| 6,333,684 | B1 | * 12/2001 | Kang | 340/7.2 |

FOREIGN PATENT DOCUMENTS

JP 09265455 7/1997 ............. G06F/1/00

OTHER PUBLICATIONS

Charles M. Kozierok, *BIOS Setup Program*, The PC Guide (http://www.PCGuide.com) Site Version: 1.8.2—Version Date: Apr. 25, 1999 © Copyright 1997–1999.
Charles M. Kozierok, *BIOS System Boot Operations*, The PC Guide (http://www.PCGuide.com) Site Version: 1.8.2—Version Date: Apr. 25, 1999 © Copyright 1997–1999.
Charles M. Kozierok, *BIOS Components and Features*, The PC Guide (http://www.PCGuide.com) Site Version: 1.8.2—Version Date: Apr. 25, 1999 © Copyright 1997–1999.
Bob Alden, *Traveling the information highway, Installing password protection*, The Institute, June 1999, vol. 23, No. 6.
Maggie Jackson, *Thieves love your labtop*, CyberLIFE, Denver Rocky Mountain News, Business Section, Mile High Tech Supplement, Mar. 22, 1999, pp. 2B and 9B.
Phoenix Technologies Ltd., *System BIOS for IBM® PC/XT™/AT® Computers and Compatibles*, The Complete Guide to ROM–Based System Software, pp. 1–26; pp. 103–111; pp. 121–126, Copyright © 1989, 1988, 1987 by Phoenix Technologies Ltd.

* cited by examiner

Primary Examiner—Emmanuel L. Moise
(74) Attorney, Agent, or Firm—David Volejnicek

(57) ABSTRACT

The BIOS device (108) or some other secure store of a portable computer (PC 100) or other valuable device stores a password-based security program (302), an encrypted password (306), and an encryption key (304). When the PC is booted, the security program executes first and prompts the user for a password, encrypts it with the stored key, and compares it with the stored password. If the passwords do not match, boot is aborted and the PC is disabled. Only if the passwords do match is boot continued and use of the PC enabled. If this security measure is advertised, theft of the PC is deterred because of the difficulty of accessing or bypassing the password and the security program in the BIOS device. The encrypted password is also registered with a remote trusted certificate authority (TCA 150) or is stored on a local external storage device (250). To establish or change the password, a communication connection is established from the PC to the TCA or storage device. If a password already exists in the PC, it is compared against the password stored by the TCA or the storage device. If they match, or if a password does not yet exist, the user is prompted for a new password, which is then encrypted and stored in both the BIOS device and the TCA or storage device. The password is also available for retrieval from the TCA or storage device in case the user forgets it.

22 Claims, 5 Drawing Sheets

DEVICE SECURITY MECHANISM BASED ON REGISTERED PASSWORDS

TECHNICAL FIELD

This invention relates generally to security mechanisms for thwarting theft or unauthorized access of devices, and particularly to password mechanisms.

BACKGROUND OF THE INVENTION

Electronic devices of all sorts are targets for thieves because of their typically-high value-to-size ratio. Portable computing devices, such as notebook computers, are particularly vulnerable to theft because they are so small, valuable, and portable. Conventional security measures are based on physical restraints that use anchoring devices and locked enclosures. But these limit portability and convenience of use. If the devices could be made useless to anyone but the owner, and advertised as such, they would lose their value to, and hence not be as much of a target for, thieves. This implies the use of some sort of a password system that cannot be defeated easily. But conventional password mechanisms are inadequate.

Software-based password systems are used in portable computers today to restrict access, but they can be defeated either by reinstalling the operating system software or, in some cases, by even simpler actions, such as exploiting loopholes in the operating systems that support them (e.g. the "Safe Mode" in Windows 95). Nevertheless, providing a password on power-up of a computer is the simplest way to validate a user. Hardware-based security systems (e.g. those available on some car radios) support password control, but if the password is lost, only major hardware surgery allows the device to be activated again. Providing a cost and effort barrier to defeating the password system is essential, but it should be easier to deal with lost passwords and allow validation of the device by some authority. Public Encrypted Signatures are used to authenticate received information as having been legitimately provided by a user. Coding and encrypting of the password by using an assigned public key can serve as a means of ensuring that one is dealing with a unique registered device. Trusted Certification Authorities exist to provide registered digital signatures and to maintain user registration information. They can be used to register signatures for coding messages. But none of these existing capabilities alone provides an adequate security mechanism for portable devices.

SUMMARY OF THE INVENTION

The inventors have recognized that there are several requirements for a security system for portable devices:

The security system should add little or no cost to the device either in parts or in manufacture, and it should not cause any additional expense to the distribution system.

The cost, in effort or money, to defeat the security system should approach or exceed the value of the device.

Access to the device should be individualized to the owner, yet allow ownership to be transferred without great difficulty.

The security system should use existing hardware, software, and security-technologies and preferably be suitable for installation on existing computers.

Any individualized information used in the security system should be able to be archived by some authority that could intervene if legitimate access to the device needed to be reestablished.

The security system should be attractive enough to become a standard and thus become supported economically by both device vendors and third parties.

Accordingly, this invention is directed to solving the problems and disadvantages and meeting the requirements of the art. Generally according to the invention, a device security apparatus comprises the following items. Storage in the device for storing a password. The storage must be secure, in that it prevents a user of the device from accessing (i.e., extracting and/or changing) the stored password while use of the device is disabled. One example of such storage is the BIOS device which stores the BIOS program of a personal computer. Another item is a connector for connecting the device to an external entity such as a local memory device or a remote trusted authority. Examples of such connectors include an input and output port and a network communications port of a personal computer. Another item is a lock in the device that is cooperative with the storage and disables use of the device unless a password is given to the lock which corresponds to the stored password. The lock may illustratively be implemented as a program that also resides in secure memory, e.g., in the BIOS device, along with the password. Another item is an arrangement that cooperates with the storage, the connector, and the lock, and responds to the use of the device having been enabled and the connection having been made to the external entity by enabling the stored password to be changed if the stored password corresponds to a password stored by the connected external entity, and by effecting storage of the changed password by the external entity. This arrangement may also illustratively be implemented as a program, but it need not be stored in secure storage.

The invention may be implemented to satisfy some or all of the requirements set out in the Background section:

1. It adds no cost in parts to the device, with the possible exception of a guaranteed communication capability. (But most intelligent devices such as computers already have a modem). It does add one step in manufacturing: that of selecting the insecure start-up mode, to install other software.
2. Defeating this security system would require that the device be opened and the secure storage (e.g., computer BIOS memory) be physically disconnected and re-written. This is not a simple or a cheap task.
3. Not only is the device ownership individualized, but also it can be transferred or changed in a secure manner.
4. No new technology is required. In fact, it might be possible to add this capability to some existing intelligent devices, such as computers.
5. A trusted authority is used to manage and control security and provides a valued service. Alternatives to the trusted authority can use a local plug-in device like a PC card to act in place of the trusted authority and provide a more local version of the system.
6. Because the invention can be implemented to satisfy all of the above-mentioned requirements, it may be attractive as a standard and/or a widely-deployed commercial capability.

These and other features and advantages of the present invention will become more apparent from the following description of an illustrative embodiment of the invention considered together with the drawing.

BRIEF DESCRIPTION OF THE DRAWING

FIG. 5 additionally includes a functional flow diagram of operations of a trusted certificate authority of the computer network of FIG. 1.

DETAILED DESCRIPTION

Figure 1:
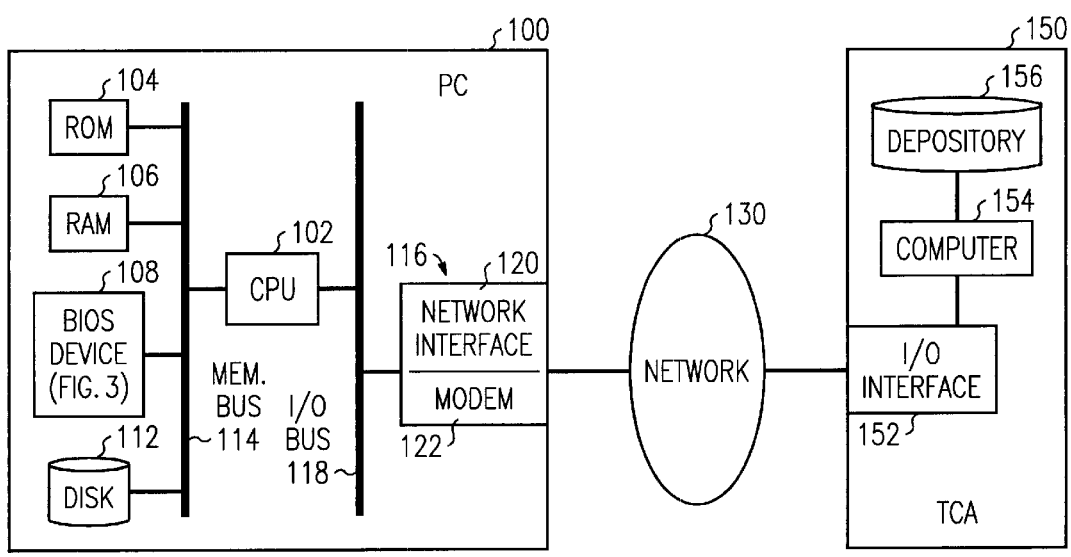
FIG. 1 is a block diagram of a computer network that includes a first illustrative embodiment of the invention.
Figure 2:
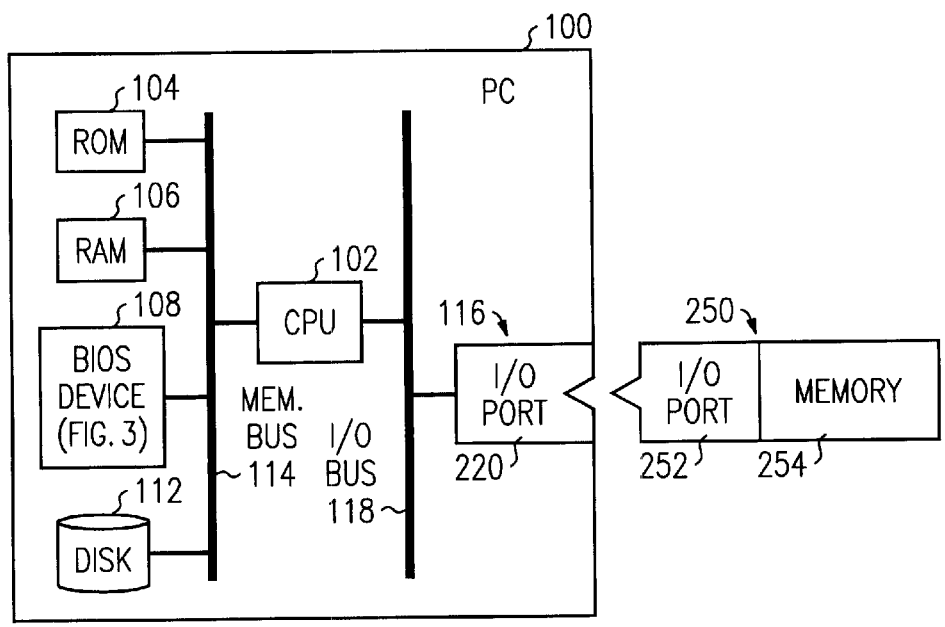
FIG. 2 is a block diagram of a computer that includes a second illustrative embodiment of the invention.

FIG. 1 shows a portable computer (PC) 100 that includes a central processing unit (CPU) 102, a read-only memory (ROM) 104, a random <access memory (RAM) 106, a basic input and output system (BIOS) device 108, and a disk memory 112, all interconnected by a memory bus 114. PC 100 further includes an input and output (I/O) interface 116 that comprises a data network interface 120 and/or a modem 122, connected to CPU 102 by an I/O bus 118. An alternative embodiment of PC 100 where I/O interface 116 comprises an I/O port 220 is shown in FIG. 2. As described so far, PC 100 is conventional. PC 100 may be any device that has a storage element like BIOS device 108: one whose contents cannot be easily accessed (extracted or changed) or bypassed by a user of the device while operation of the device is disabled, and whose operability hinges on those contents.

BIOS device 108 comprises non-volatile, "permanent", memory, one whose contents are preserved even when power is absent. Unlike ROM 104, however, it is electrically alterable and programmable under control of special software, in order to update BIOS over the life of PC 100. Storage devices of this type are known as programmable read-only memory (PROM), electrically-erasable PROM (EEPROM), or flash memory. When PC 100 is booted, e.g., powered up, CPU 102 begins to execute instructions out of ROM 104. These instructions cause CPU 102 to transfer the contents (the BIOS program) of BIOS device 108 into RAM 106 and to execute those contents out of RAM 106. Execution of the BIOS program boots PC 100. PC 100 cannot be booted without the BIOS program. And if PC 100 cannot be booted, the BIOS program cannot be updated or altered. So, if contents of BIOS device 108 get "corrupted", either BIOS device 108 must be replaced, or, PC 100 must be returned to the manufacturer who can physically bypass the normal electrical connections to BIOS device 108 and reprogram it. This is also conventional.

Figure 3:
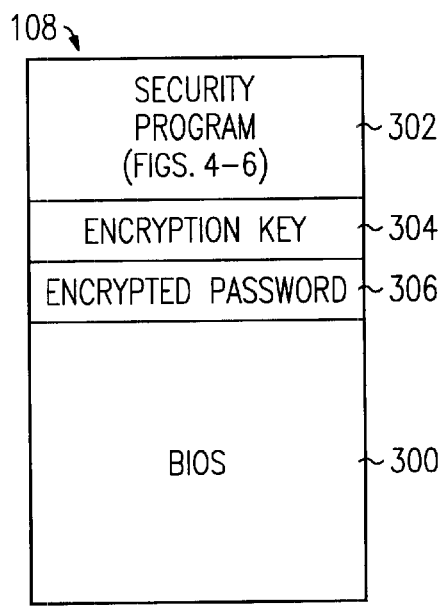
FIG. 3 is a block diagram of contents of a BIOS device of portable computers of FIGS. 1 and 2.

The contents of BIOS device 108 are shown in FIG. 3. According to the invention, BIOS device 108 implements a security mechanism for theft deterrence. In addition to containing the conventional BIOS program 300, device 108 also contains a security program 302 including encryption key 304 and password 306 entries. Security program 302 is appended to the beginning of BIOS program 300 so that at boot time it is loaded into RAM 104 either prior to or along with BIOS program 300 and is executed prior to completion of the execution of BIOS program 300.

The basic concept of the security mechanism is to have a unique password 306 stored in BIOS device 108 and require that password 306 be entered and matched from the keyboard or other 10 device at the very beginning of each boot (e.g., power-on) cycle to allow the boot cycle and subsequent PC 100 operation to continue. A mismatch of password 306 is a functional equivalent of a "corrupt" BIOS program 300. Consequently, PC 100 is of no use to anyone who does not have password 306. And overriding of the security mechanism is very difficult. It requires either that BIOS device 108 be replaced with a new one, or that PC 100 be returned to the manufacturer who can physically bypass the normal electrical connections to BIOS device 108 and reprogram it. This makes PC 100 economically not worth stealing, and hence deters theft.

On the one hand, the security mechanism must be robust enough to make its breach or override too difficult to be worthwhile. On the other hand, the security mechanism has to be flexible enough to allow use of the machine to be restored if the password is forgotten and to allow security to be restored if the password is compromised or the machine changes hands legitimately. For this purpose, the concept of the trusted certification authority (TCA) 150 is introduced (see FIG. 1).

TCA 150 is a repository of passwords and a service for passwords maintenance. It may be provided, for example, as a service to customers by the manufacturer or vendor of PCs 100, or as a subscription for-fee service by a third party. As shown in FIG. 1, a TCA 150 comprises an I/O interface 152 to a communications network 130 (e.g., a data network or a telephone network) that allows TCA 150 to communicate with PCs 100, a computer 154 that executes TCA service programs, and a depository 156 (e.g., a database) for storing passwords and related information.

In the alternative embodiment shown in FIG. 2, a central TCA 150 is dispensed with, and each PC 100 is provided with a security card 250 that provides TCA-substitute functionality for its corresponding PC 100 only. Security card 250 comprises an I/O port 252 that removably mates with (e.g., plugs into) I/O port 220 of PC 100, and a memory 254. It is illustratively a PCMCIA card or a floppy disk.

A newly-manufactured PC 100 is not secure, in that it does not have a valid password 306 installed therein; rather, password 306 has a null value. This insecure mode allows PC 100 to be initialized with software at the factory and to be tested without hindrance. PC 100 may also be sold without a valid password 306. But in order to deter theft of PC 100 prior to it being sold to an end user, PC 100 may be programmed with a valid password 306 prior to leaving the factory. In the latter case, the password must be communicated to the purchaser at time of sale, and either password 306 and information identifying the owner of PC 100 must be entered in depository 156 of TCA 150, or password 306 must be entered in memory 254 of security card 250, as soon as possible.

Figure 4:
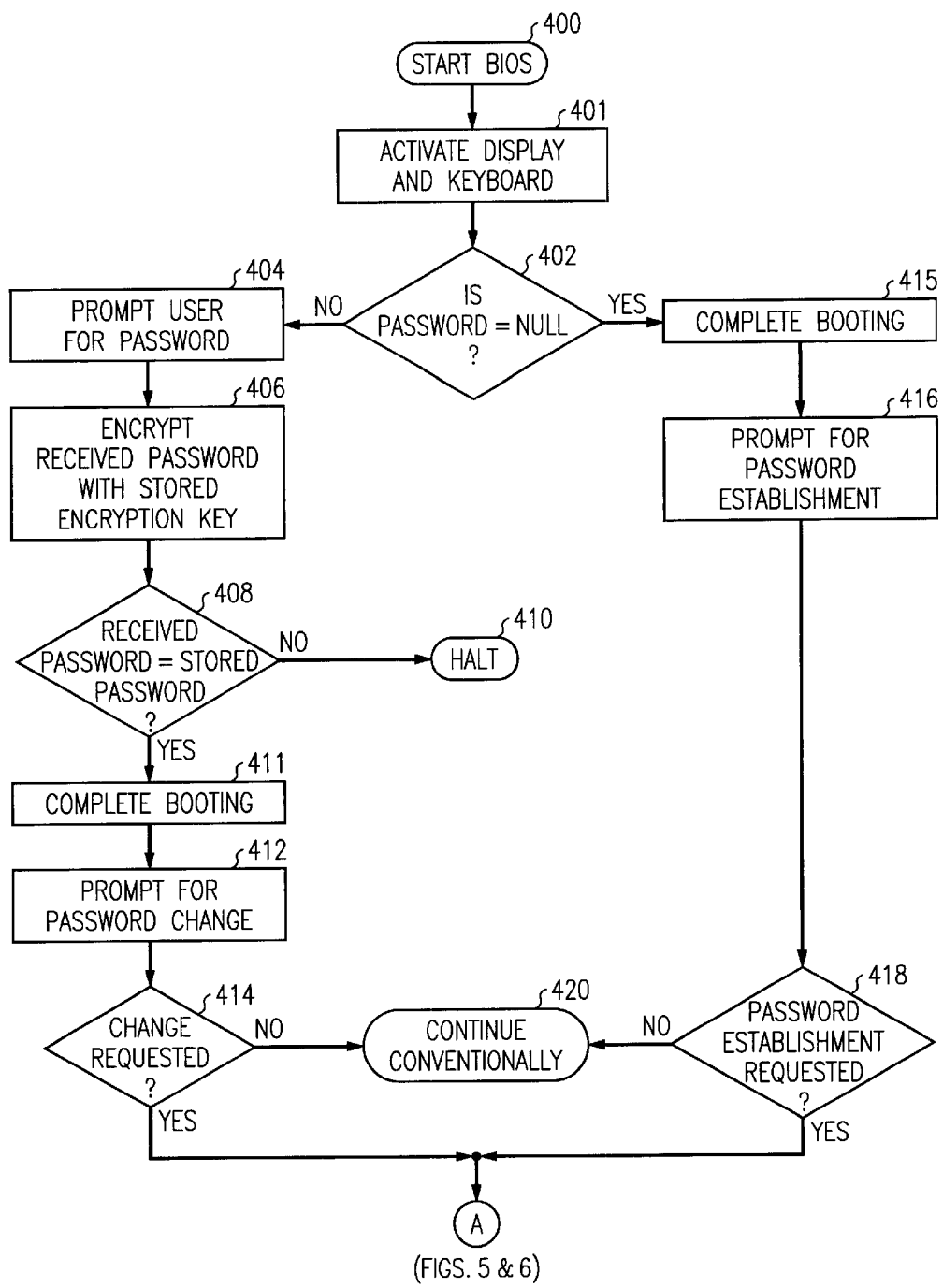
FIGS. 4–6 are a functional flow diagram of operations of a security program of the portable computers of FIGS. 1 and 2.

The functionality of security program 302 is shown in FIGS. 4 et seq. When execution of BIOS device 108 contents begins, at step 400, e.g., upon power-up, CPU 102 activates the display and keyboard of PC 100, at step 401. Since most BIOS programs 300 include rudimentary display and keyboard drivers, step 401 generally involves execution of that portion of BIOS program 300 that activates the display and keyboard. In the case of BIOS programs 300 that do not make the keyboard and display operable, step 401 involves execution of a portion of security program 302 which either contains rudimentary display and keyboard drivers or which loads the display and keyboard drivers from disk and activates them. CPU 102 then executes program 302 and first checks password 306 to determine if its value is null, at step 402. If it is not null, PC 100 is operating in a secure mode, and so CPU 102 prompts the user of PC 100 to enter the password, at step 404, illustratively by displaying a prompt to that effect on a display screen of PC 100. When the user responds, illustratively by typing the password on a keyboard of PC 100, CPU 102 encrypts the received password with the stored encryption key 304, at step 406, and then compares the encrypted received password with password 306 which is also encrypted with key 304, at step 408, to determine if they match. If they do not match, CPU 102 halts the boot and further operation of PC 100, at step 410, rendering PC 100 unusable. If they do match, PC 100 is secure, and so CPU 102 completes booting PC 100, at step 411. But prior to relinquishing control, security program 302 causes CPU 102 to prompt the user to indicate if he or she wishes to change the password, at step 412. If the user does not so indicate, as determined at step 414, PC 100 continues to operate conventionally but in a secure mode, at step 420.

Returning to step 402, if password 306 is determined there to be null, it means that PC 100 is operating in an insecure mode, and so CPU 102 completes booting PC 100, at step 415. But prior to relinquishing control, security program 302 causes CPU 102 to prompt the user to establish a valid password 306, at step 416. If the user elects not to establish a password, as determined at step 418, PC 100 continues to operate conventionally in the insecure mode, at step 420.

In order to keep the security mechanism from being thwarted, steps 402–410 of security program 302 are the only ones that need to be protected from bypass or override, because they constitute the security gateway or lock that enables or disables (controls) operability of PC 100. Therefore, they are the only portion of security program 302, along with password 306 and encryption key 304, that must be stored in a secure memory such as BIOS device 108. After that, the security gateway has been passed, either because the value of password 306 is null or because the correct password was entered. In either case, the user is now free to use PC 100 in any way desired. Therefore, the remainder of security program 302, which merely controls changing (including initial establishment) of password 306, may be stored in any other memory of PC 100 where it can be accessed by CPU 102. For example, if a floppy disk is in the disk drive, BIOS program 300 will attempt to complete the boot from it, as is conventional in PCs, and so the remainder of security program 302 may be stored on a floppy disk and executed at this point to install or modify password 306. As will be seen below, password maintenance is functionally no different than upgrading or altering BIOS program 300, except that only a couple of entries 304 and 306 of BIOS device 108 are changed and that communications to the outside of PC 100 are taking place.

Figure 5:
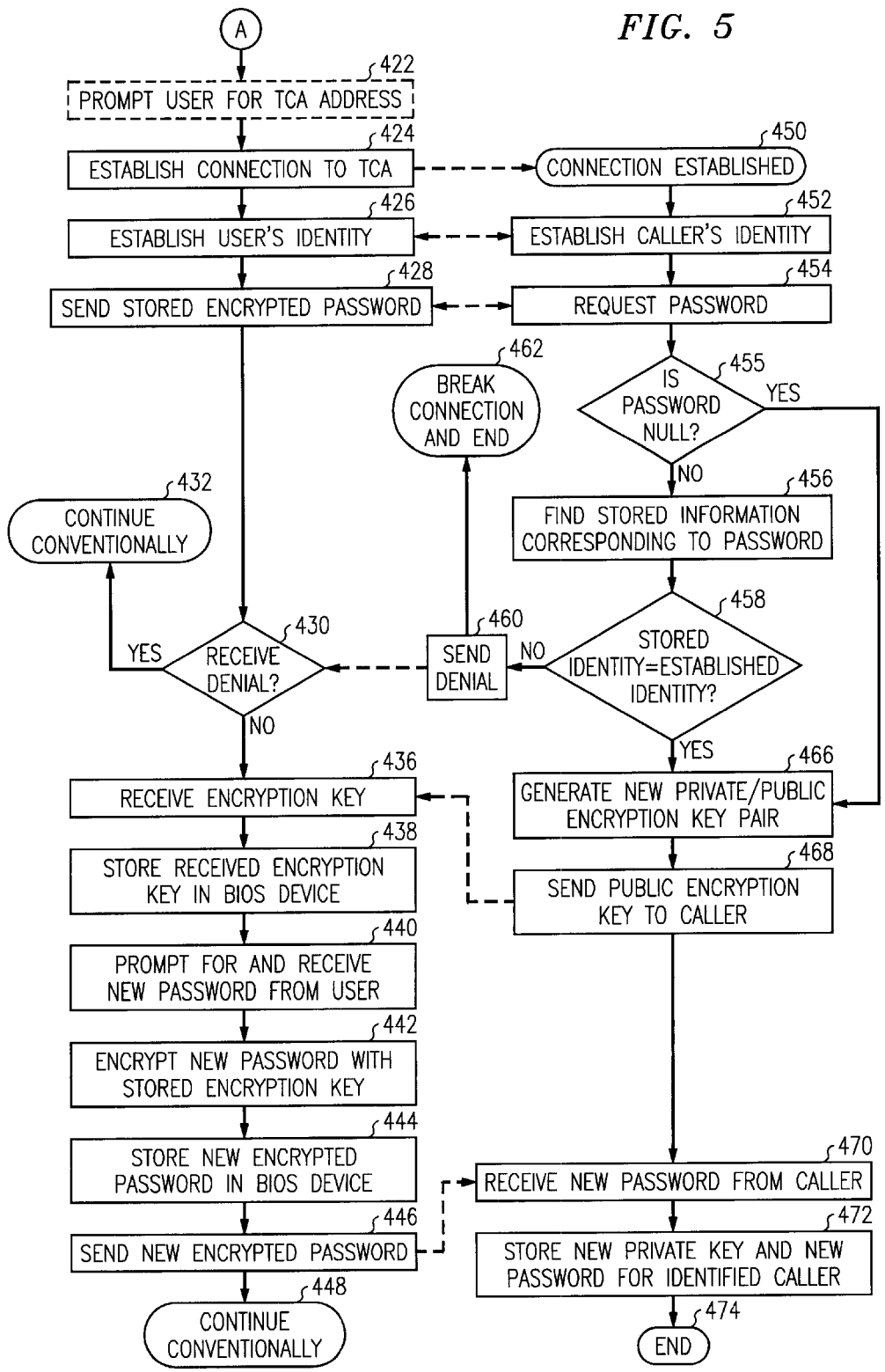
Figure 6:
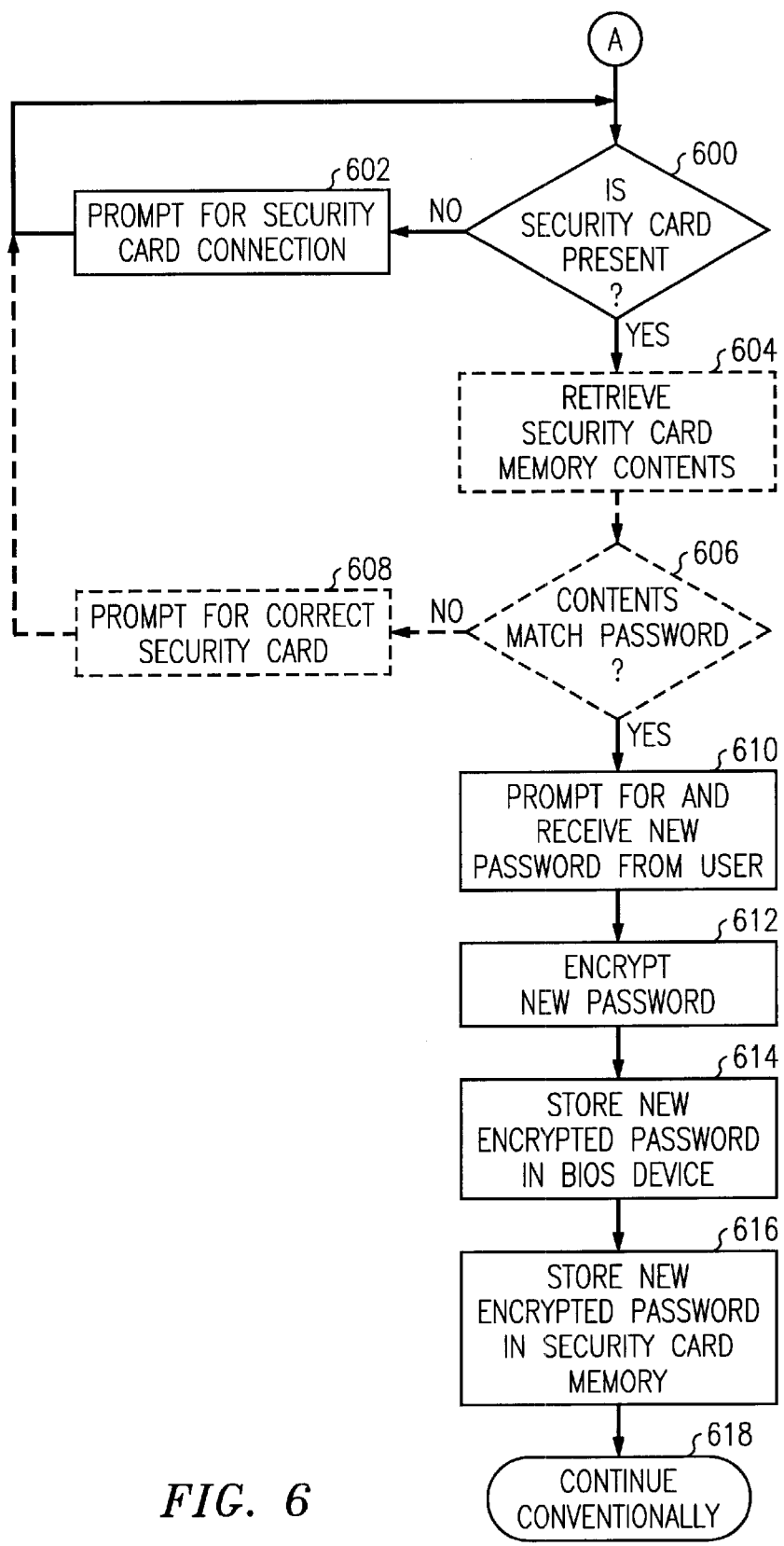

Returning to consider the drawing, if the user elects to change the password at step 414 of FIG. 4 or elects to establish a password at step 418, CPU 102 proceeds to interact with either TCA 150 in FIG. 5 or security card 250 in FIG. 6. Turning first to FIG. 5, CPU 102 establishes a connection to TCA 150 via network interface 120 and data network 130 (e.g., a LAN or the Internet) or via modem 122 and telephone network 130, at step 424, in a conventional manner. The requisite address of TCA 150 is either stored as a part of security program 302, or CPU 102 prompts the user to provide the address, at step 422. When the connection is established, at step 450, PC 100 and TCA 150 cooperate to establish the calling user's identity, at steps 426 and 452. For example, TCA 150 asks questions of the user via network 130, the user answers them via PC 100, and TCA 150 compares the answers against information it has stored in depository 156 about the user to determine if there is a match. Alternatively, steps 426 and 452 may be dispensed with in the case of changing an existing password. When the user's identity is established to the satisfaction of TCA 150, TCA 150 requests the stored encrypted password 306 of PC 100, at step 454, and CPU 102 obliges by retrieving and returning password 306, at step 428. If the received password 306 is not null, as determined at step 455, TCA 150 searches its depository 156 for this password and any information paired and stored in association therewith, including a user's identity, at step 456. If the password is found in depository 156, TCA 150 determines if its paired information matches the caller's identity that was determined at step 452, at step 458. If the stored identity and the calling user's identity do not match, TCA 150 sends a notice thereof and a denial of the transaction to PC 100, at step 460, and ends the transaction by breaking the connection to PC 100, at step 461. Alternatively, if steps 426 and 452 were not performed, TCA 150 merely searches depository 156 for the received password at step 456, and checks for presence of that password in depository 156 at step 458. When CPU 102 determines that the transaction has been denied, at step 430, it continues conventional operation, at step 432, without a change of the password. Alternatively, CPU 102 negates the boot-up and halts PC 100 at step 432, thereby rendering PC 100 useless.

If the identity of the calling user was found to match the user identity stored by TCA 150 for password 306 of this PC 100 at step 458, or if the received password was found to be null at step 455, TCA 150 generates a new private/public encryption key pair, at step 466, and sends the public encryption key of the pair to PC 100, at step 468. CPU 102 receives the public encryption key, at step 436, and stores it in encryption key 304 of BIOS device 108, at step 438, overwriting any previous value of encryption key 304 in the process. CPU 102 then prompts the user for a new password and, upon receiving it, at step 440, encrypts the new password with the stored encryption key 304, at step 442. Under control of the conventional special software for programming BIOS device 108, CPU 102 then stores the new encrypted password in password 306 of BIOS 108, at step 444, overwriting any previous value of password 306 in the process. Some BIOS devices may require overwriting of the entire device in order to change any contents thereof, in which case either TCA 150 must supply the entire BIOS device 108 contents with the new encryption key and password, or CPU 102 must read out the contents of the BIOS device to create an image thereof, change the encryption key and the password in the image, and then write the changed image back into the BIOS device. CPU 102 also sends the new encrypted password to TCA 150, at step 446. PC 100 then proceeds to operate conventionally, at step 448. TCA 150 receives the new encrypted password, at step 470, and stores it and the private key of the newly-generated encryption key pair instead of the previous password and key with the caller identification information in depository 156, at step 472. TCA 150 then ends its operation, at step 474.

If the user should ever forget the password, the user can retrieve it with the help of TCA 150. For example, the user calls an operator of TCA 150 and establishes his or her identity to the operator in the manner of steps 426 and 452. Information about the user that is stored in depository 156 may include a voiceprint of the user, and the operator may use this voiceprint and the user's voice incoming on the call to authenticate the user. Once the user has been authenticated, the operator directs computer 154 to decrypt the user's password. Computer 154 does so by retrieving the user's encrypted password and private encryption key from depository 156 and using the private key to decrypt the password. The operator then reports the decrypted password to the user via the call, with an admonition to change the password as soon as possible in case the call is not secure.

If the user of PC 100 that is equipped with a security card 250, as in the embodiment of FIG. 2, elects to change the password at step 414 or elects to establish a password at step 418, CPU 102 proceeds to interact with security card 250 in the manner shown in FIG. 6. First, CPU 102 checks for presence of security card 250 in I/O port 220, at step 600. If security card 250 is not connected to I/O port 220, CPU 102 prompts the user of PC 100 to make the connection, at step 602, and then returns to step 600. If and when CPU 102 determines at step 600 that security card 250 is connected to I/O port 220, it may optionally check, at steps 604–608, whether it is the correct security card 250 for this PC 100, so as to prevent inadvertent destruction of a password for another device. To perform this check, CPU 102 retrieves from security card 250 the contents of memory 254, at step 604, and compares these contents against password 306 to determine if they match, at step 606. If they do not match, CPU 102 prompts the user to connect the correct security card 250 to PC 100, at step 608, and then returns to step 600. If and when it finds the correct security card 250 connected to PC 100, at step 606, or if the check at steps 604-608 for the correct security card 250 is not performed, CPU 102 prompts for and receives from the user a new password, at step 610. CPU 102 then encrypts the new password by using encryption key 304, at step 612. Using public key encryption is not necessary, since there is no remote agency like TCA 150 involved. Optionally, a common key can be used in all PCs 100, as is common in most UNIX operating system environments, for example. Under control of the conventional special software for programming BIOS device 108, CPU 102 then stores the new encrypted password as password 306 in BIOS device 108, at step 614. CPU 102 also stores it in memory 254 of security card 250 in place of any previously stored contents therein, at step 616. As in step 444 of FIG. 5, security card 250 may need to supply the entire BIOS service 108 contents along with the new password 308. Alternatively or additionally, CPU 102 may store the unencrypted password in memory 254 of security card 250. This has the advantage that, if the user ever forgets the password, he or she can retrieve it (read and/or display it) from security card 250 via another machine that has a compatible I/O port 220. This presumes that the user can be counted upon to keep security card 250 physically secure and separate from PC 100. CPU 102 then continues to operate conventionally.

Of course, various changes and modifications to the illustrative embodiment described above will be apparent to those skilled in the art. For example, the invention may be implemented differently on different devices (e.g., in manufacturer-specific or even model-specific manner) so that, if the security of one implementation should be breached, it will not affect all devices. For this purpose, a device (PC) serial number may be stored in ROM 104 and used to identify the manufacturer and/or model. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A device security apparatus comprising:
   storage in the device for storing a password and preventing a user of the device from accessing the stored password while use of the device is disabled;
   a connector connecting the device to an external entity;
   a lock in the device, cooperative with the storage, that disables use of the device unless a password is given to the lock which corresponds to the stored password; and
   an arrangement cooperative with the storage, the connector, and the lock, responsive to the use of the device having been enabled and the connection having been made to the external entity, for enabling the stored password to be changed if the stored password corresponds to a password stored by the connected external entity, and for effecting storage of said changed password by the external entity,
   the arrangement including
   means for establishing the user's identity with the external entity,
   means for providing the stored password to the external entity, and
   means for enabling the stored password to be changed in response to receiving an indication from the external entity that the established identity and provided password match an identity and the password stored by the external entity.

2. The apparatus of claim 1 for a computer, wherein:
   the storage comprises a BIOS device storing a BIOS program of the computer and the password.

3. The apparatus of claim 1 wherein:
   the connector comprises a communications port of the device.

4. The apparatus of claim 1 wherein:
   the connector comprises a network communications port of the device; and
   the entity comprises a remote trusted authority.

5. The apparatus of claim 1 wherein:
   the connector comprises an input port of the device; and
   the entity comprises a local storage device.

6. The apparatus of claim 1 for a stored-program-controlled device, wherein:
   the lock comprises a stored program that executes upon power-up of the device.

7. The apparatus of claim 6 for a computer, wherein:
   the storage comprises a BIOS device storing a BIOS program of the computer, the password, and the lock program.

8. The apparatus of claim 6 wherein:
   the arrangement comprises a stored program of the device.

9. The apparatus of claim 1 wherein:
   the arrangement further includes
   means responsive to receipt of a new password from the user, for storing the new password in the storage and sending the new password to the external entity for storage.

10. The apparatus of claim 1 wherein:
    the storage stores an encrypted said password and an encryption key; and
    the lock is responsive to receipt of an unencrypted password by encrypting the received password with the stored encryption key, comparing the encrypted received password with the stored encrypted password, and disabling use of the device if the compared passwords do not match.

11. The apparatus of claim 10 wherein:
    the arrangement includes
    means for establishing the user's identity with the external entity,
    means for providing the stored encrypted password to the external entity, means for enabling the stored password to be changed in response to receiving an indication from the external entity that the established identity and provided password match an identity and the password stored by the external entity, means for storing a new encryption key received from the external entity in the storage, and means for encrypting a new password received from the user with the stored new encryption key, storing the encrypted new password in the storage, and sending the encrypted new password to the external entity for storage.

12. A device security apparatus comprising:

storage in the device for storing an encrypted password and an encryption key and preventing a user of the device from accessing the stored password while use of the device is disabled;

a connector connecting the device to an external entity;

a lock in the device, cooperative with the storage, that disables use of the device unless a password is given to the lock which corresponds to the stored password, the lock being responsive to receipt of an unencrypted password by encrypting the received password with the stored encryption key, comparing the encrypted received password with the stored encrypted password, and disabling use of the device if the compared passwords do not match; and an arrangement cooperative with the storage, the connector, and the lock, responsive to the use of the device having been enabled and the connection having been made to the external entity, for enabling the stored password to be changed if the stored password corresponds to a password stored by the connected external entity, and for effecting storage of said changed password by the external entity.

13. The apparatus of claim 12 wherein:

the arrangement includes means for establishing the user's identity with the external entity, means for providing the stored password to the external entity, and means for enabling the stored password to be changed in response to receiving an indication from the external entity that the established identity and provided password match an identity and the password stored by the external entity.

14. The apparatus of claim 13 wherein:

the arrangement further includes means responsive to receipt of a new password from the user, for storing the new password in the storage and sending the new password to the external entity for storage.

15. The apparatus of claim 12 for a computer, wherein:

the storage comprises a BIOS device storing a BIOS program of the computer and the password.

16. The apparatus of claim 12 wherein:

the connector comprises a communications port of the device.

17. The apparatus of claim 12 wherein:

the connector comprises a network communications port of the device; and the entity comprises a remote trusted authority.

18. The apparatus of claim 12 wherein:

the connector comprises an input port of the device; and the entity comprises a local storage device.

19. The apparatus of claim 12 for a stored-program-controlled device, wherein:

the lock comprises a stored program that executes upon power-up of the device.

20. The apparatus of claim 19 for a computer, wherein:

the storage comprises a BIOS device storing a BIOS program of the computer, the password, and the lock program.

21. The apparatus of claim 19 wherein:

the arrangement comprises a stored program of the device.

22. The apparatus of claim 12 wherein:

the arrangement includes means for establishing the user's identity with the external entity, means for providing the stored encrypted password to the external entity, means for enabling the stored password to be changed in response to receiving an indication from the external entity that the established identity and provided password match an identity and the password stored by the external entity, means for storing a new encryption key received from the external entity in the storage, and means for encrypting a new password received from the user with the stored new encryption key, storing the encrypted new password in the storage, and sending the encrypted new password to the external entity for storage.

\* \* \* \* \*